US008185233B2

(12) United States Patent
Sagara et al.

(10) Patent No.: US 8,185,233 B2
(45) Date of Patent: May 22, 2012

(54) NUMERICAL CONTROLLER HAVING MULTI-PATH CONTROL FUNCTION

(75) Inventors: Shouichi Sagara, Yamanashi (JP);
Yorikazu Fukui, Yamanashi (JP);
Mitsuhiro Kamijo, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 1091 days.

(21) Appl. No.: 12/078,137

(22) Filed: Mar. 27, 2008

(65) Prior Publication Data

US 2008/0250359 A1    Oct. 9, 2008

(30) Foreign Application Priority Data

Apr. 3, 2007   (JP) .................................. 2007-097038

(51) Int. Cl.
*G06F 19/00* (2006.01)
(52) U.S. Cl. ..................... 700/169; 717/110; 715/225
(58) Field of Classification Search .................. 700/110, 700/113, 180, 181, 184; 717/110; 751/225; 715/225
See application file for complete search history.

(56) References Cited

U.S. PATENT DOCUMENTS

| | | | | |
|---|---|---|---|---|
| 4,433,373 A | * | 2/1984 | Miller | ........................... 700/181 |
| 5,815,399 A | * | 9/1998 | Fujibayashi et al. | ........... 700/169 |
| 6,957,122 B2 | | 10/2005 | Dütsch et al. | |
| 2006/0058907 A1 | * | 3/2006 | Suderman | ..................... 700/184 |
| 2007/0050091 A1 | * | 3/2007 | Nagatsuka et al. | ........... 700/259 |

FOREIGN PATENT DOCUMENTS

| | | |
|---|---|---|
| JP | 3-196306 | 8/1991 |
| JP | 8-112737 | 5/1996 |
| JP | 63-317808 | 12/1998 |
| JP | 2000-122709 | 4/2000 |
| JP | 2002-182715 | 6/2002 |
| JP | 2005-122584 | 5/2005 |

OTHER PUBLICATIONS

European Search Report dated Aug. 20, 2010 issued in European Application No. 08 15 3325.9.
Japanese Notification of Reasons for Refusal mailed Jun. 29, 2010 issued in Japanese Application No. 2008-261240 (including a partial translation thereof).

* cited by examiner

*Primary Examiner* — Dave Robertson
(74) *Attorney, Agent, or Firm* — Drinker Biddle & Reath LLP

(57) ABSTRACT

Programs of a plurality of paths are displayed in parallel on a display screen. If a cursor of an editing target program is moved, cursors of the other programs are interlocked and moved so as to be aligned on a same row. If a sequence number that is set to any of blocks at a cursor position is a synchronization target sequence number, the movement of the cursor is stopped. If a cursor is operated further, a program of a path which does not have a block having the synchronization target sequence number at a cursor position is scrolled until a block having the synchronization target sequence number reaches a cursor position, then stops. As a result, synchronization target blocks in each path are positioned on a same row.

11 Claims, 11 Drawing Sheets

FIG. 3A

| FIRST PATH | SECOND PATH | THIRD PATH |
|---|---|---|
| G90; | G00; | Z200. ; |
| N333 G01; | X50. ; | M04 200; |
| X100. ; | N333 G01; | N333 T03; |
| Y200. ; | X200. ; | G54; |
| M04 S100; | N444 M06; | G00 X50; |
| T01; | Z100. ; | N444 Z30.; |
| N444 G00; | M04 S300; | M06S0; |

⇧ PROGRAM PROGRESS DIRECTION BY CURSOR OPERATION

FIG. 3B

| FIRST PATH | SECOND PATH | THIRD PATH |
|---|---|---|
| G90; | G00; | Z200. ; |
| N333 G01; | X50. ; | M04 200; |
| X100. ; | N333 G01; | N333 T03; |
| Y200. ; | X200. ; | G54; |
| M04 S100; | N444 M06; | G00 X50; |
| T01; | Z100. ; | N444 Z30.; |
| N444 G00; | M04 S300; | M06S0; |

FIG. 3C

| FIRST PATH | SECOND PATH | THIRD PATH |
|---|---|---|
| G90; | X50. ; | M04 200; |
| N333 G01; | N333 G01; | N333 T03; |
| X100. ; | X200. ; | G54; |
| Y200. ; | N444 M06; | G00 X50; |
| M04 S100; | Z100. ; | N444 Z30.; |
| T01; | M04 S300; | M06S0; |
| N444 G00; | T02; | T04; |

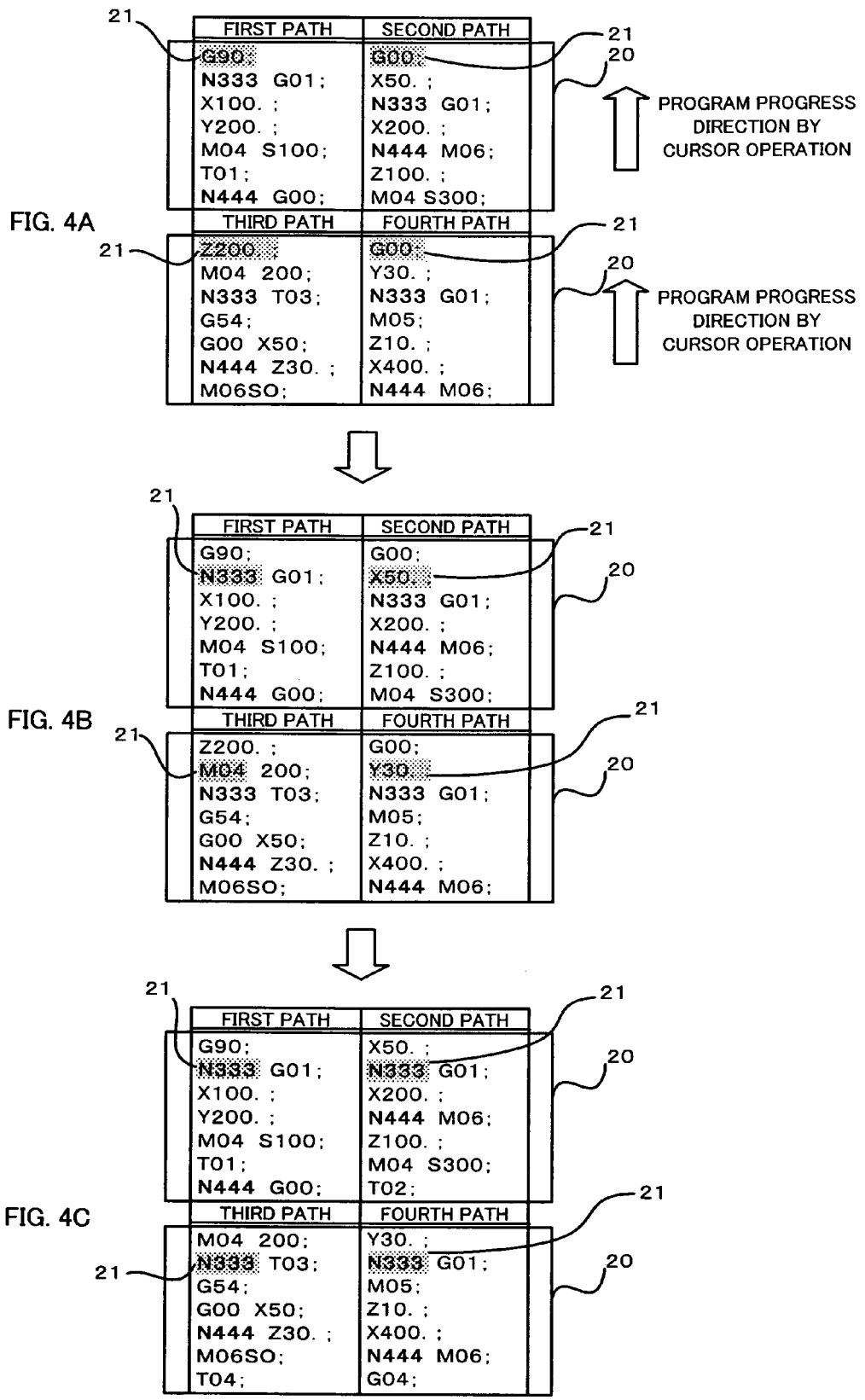

FIG. 6A

| FIRST PATH | SECOND PATH | THIRD PATH |
|---|---|---|
| G90; | G00; | Z200.; |
| N333 G01; | X50.; | M04 200; |
| X100.; | N333 G01; | N333 T03; |
| Y200.; | X200.; | G54; |
| M04 S100; | N444 M06; | G00 X50; |
| T01; | Z100.; | N444 Z30.; |
| N444 G00; | M04 S300; | M06S0; |

PROGRAM PROGRESS DIRECTION BY CURSOR OPERATION

FIG. 6B

| FIRST PATH | SECOND PATH | THIRD PATH |
|---|---|---|
| G90; | G00; | Z200.; |
| N333 G01; | X50.; | M04 200; |
| X100.; | N333 G01; | N333 T03; |
| Y200.; | X200.; | G54; |
| M04 S100; | N444 M06; | G00 X50; |
| T01; | Z100.; | N444 Z30.; |
| N444 G00; | M04 S300; | M06S0; |

PROGRAM SHIFT

FIG. 6C

| FIRST PATH | SECOND PATH | THIRD PATH |
|---|---|---|
| G90; | X50.; | M04 200; |
| N333 G01; | N333 G01; | N333 T03; |
| X100.; | X200.; | G54; |
| Y200.; | N444 M06; | G00 X50; |
| M04 S100; | Z100.; | N444 Z30.; |
| T01; | M04 S300; | M06S0; |
| N444 G00; | T02; | T04; |

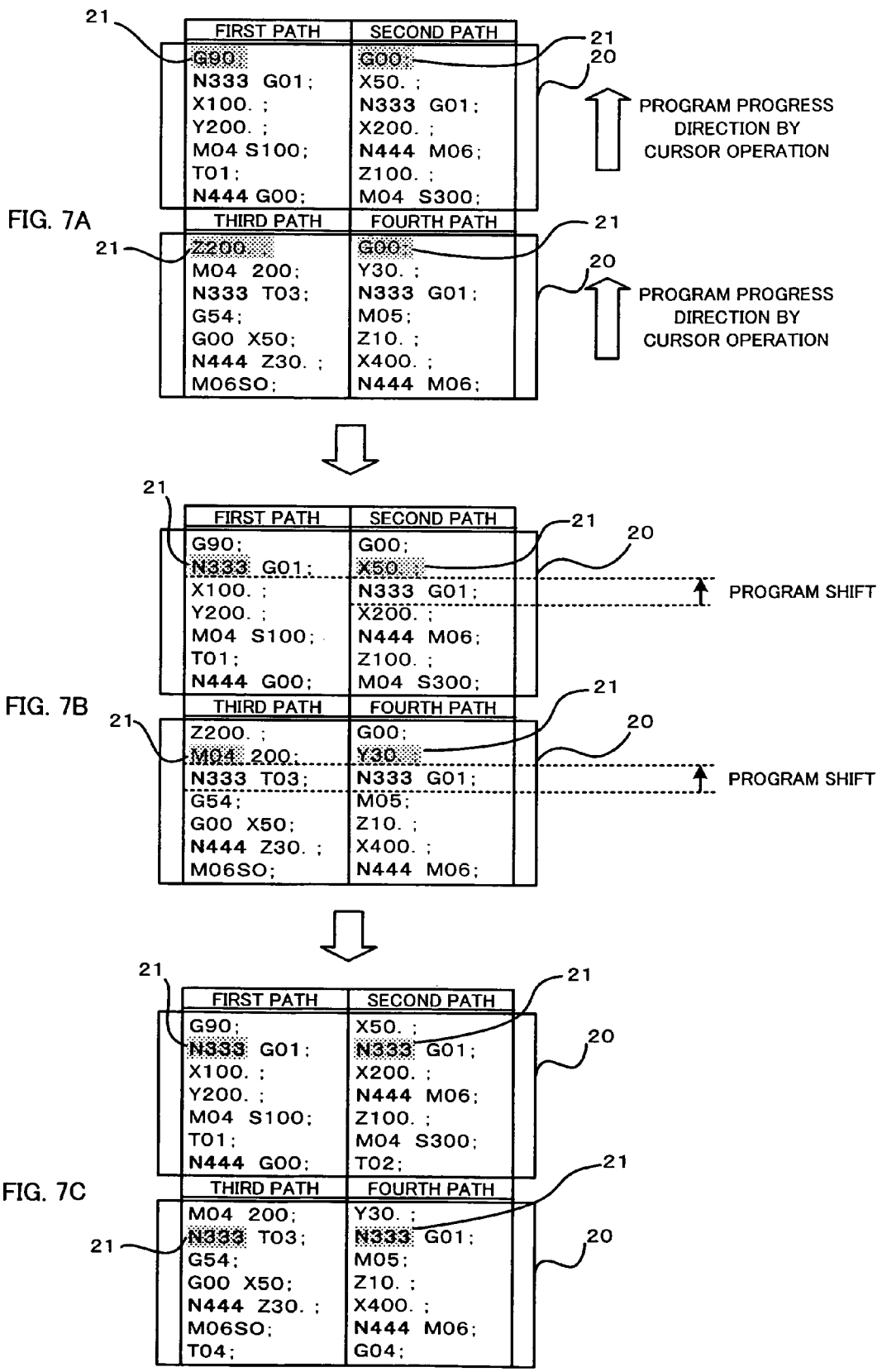

SYNCHRONIZATION
AT POSITION OF
ELAPSED TIME Ts
(E. G. THREE MINUTES)

SYNCHRONIZATION AT POSITION OF ELAPSED TIME Ts (E. G. THREE MINUTES)

NUMERICAL CONTROLLER HAVING MULTI-PATH CONTROL FUNCTION

BACKGROUND OF THE INVENTION

1. Field of the Invention

The present invention relates to a numerical controller having a multi-path control function, and more particularly to a numerical controller which can display programs of each path in parallel, and edit them.

2. Description of the Related Art

In a numerical device which can control a plurality of paths, a plurality of processing steps can be simultaneously or continuously performed by operating machines, such as machine tools, while synchronizing with the paths, executing programs for each path respectively. To edit the processing programs selected by each path in a numerical controller which can control multi-paths according to a prior art, a target path of editing is switched, synchronization conditions are visually checked, and the target path is individually edited.

As a method for displaying the programs of each path on a display device, a method for displaying the programs of each path in parallel, or a method for displaying them in serial, is known. In the case of a parallel display, a method of displaying the programs of each path in parallel, in association with the respective time, so that the time relationship is recognized is known, and in the case of a serial display, a method of displaying multi-path control and single control, which coexist in one processing program, in serial, is known, as disclosed in Japanese Patent Application Laid-Open No. 2000-122709.

In the case of editing programs in each path, which requires cooperatively and simultaneously moving the axes controlled by a plurality of paths by program instructions in each path, it is necessary to recognize the execution sequence of program instructions in each path, and edit while confirming the relationships of synchronization, execution and queuing among the paths. However, if a method for displaying the programs of each path in serial is used, recognizing the time relationships among paths is difficult, hence editing thereof is difficult. Even if the programs of each path are displayed in parallel, it is difficult to recognize the time relationships of complicated synchronization, execution and queuing among paths if the programs are merely displayed in parallel. Therefore as the above mentioned Japanese Patent Application Laid-Open No. 2000-122709 discloses, a method for displaying the programs of each path in parallel and displaying the time relationship in association with queuing codes, so that the time relationships can be easily understood, has been proposed, but in the case of this method, blanks increase and portions to display programs decreases, therefore the editing operation becomes difficult.

SUMMARY OF THE INVENTION

With the foregoing in view, it is an object of the present invention to provide a numerical controller having a multi-path control function which displays the programs of each path simultaneously on a same screen in parallel, allowing an operator to easily recognize the synchronization relationships, and display each program without blanks.

The present invention relates to a numerical controller having a display device which has a multi-path control function, an editing function which allows displaying the programs of a plurality of paths in parallel and editing the programs, and cursor operation means for moving a cursor on a display screen.

A first aspect of a numerical controller according to the present invention comprises: cursor movement control means by which when a cursor that points to an editing location in an editing target program is relatively moved with respect to the program by an operation of the cursor operation means in a state of displaying programs of at least two paths in parallel on a same screen, a cursor in a program of a path other than the path of the editing target program is relatively moved with respect to the program so as to be aligned on a same row, in conjunction with the cursor; judgment means for judging whether a block, in which a cursor exists, has information indicating a synchronization target; means for relatively moving a program with respect to a cursor by the operation of the cursor operation means, and stopping the relative movement of the cursor with respect to the program by the cursor movement control means, when the judgment means judges that the block has information indicating a synchronization target; and means for having the cursor movement control means execute relative movement of a cursor with respect to the program by the operation of the cursor operation means again after the relative movement of the programs of all the displayed path with respect to the cursor stop. Hence the synchronization target blocks can be displayed on a same row by the cursor operation.

The second aspect of the numerical controller according to the present invention comprises: cursor movement control means by which when a cursor that points to an editing location in an editing target program is moved by an operation of cursor operation means in a state of displaying programs of at least two paths in parallel on a same screen, a cursor in a program of a path other than the path of the editing target program is moved so as to be aligned on a same row, in conjunction with the cursor; judgment means for judging whether a block in which a cursor exists has information indicating a synchronization target; means for making the cursor movement control means invalid to stop the movement of the cursor when the judgment means detects a block having information indicating a synchronization target in any of the paths; scrolling means for scrolling a program of a path which has no block having information indicating a synchronization target at a cursor position, by operation of the cursor operation means, after movement of the cursor stops; scroll stopping means for stopping the scroll operation by the scrolling means when the judgment means has judged that a block having information indicating a synchronization target has reached a cursor position; and means for making the cursor movement control means valid to enable movement of a cursor after scrolling all the programs in scrolling state stop. Hence the synchronization target blocks can be displayed on a same row by the cursor operation.

A third aspect of the numerical controller according to the present invention comprises: cursor movement control means by which when a cursor that points to an editing location in an editing target program is moved by an operation of cursor operation means in a state of displaying programs of at least two paths in parallel on a same screen, a cursor in a program of a path other than the path of the editing target program is moved so as to be aligned on a same row, in conjunction with the cursor; judgment means for judging whether a block in which a cursor exists has information indicating a synchronization target; means for making the cursor movement control means invalid to stop movement of the cursor when the judgment means judges that a block in which a cursor exists in an editing target program has information indicating a synchronization target; means for searching a block having information corresponding to the information indicating a synchronization target of the block in the program of the editing target path where the cursor stopped, concerning a program of a path other than the path of the editing target program, after movement of the cursor stops; means for shifting a program so that the block acquired by the searching comes to the cursor position; and means for making the cursor movement control means valid to enable movement of a cursor after a shift of the program completes, and a synchronization target block of a program of each path is positioned at the cursor position. Hence the synchronization target blocks can be displayed on a same row.

A fourth aspect of the numerical controller according to the present invention comprises: cursor movement control means by which when a cursor that points to an editing location in an editing target program is moved by an operation of cursor operation means in a state of displaying programs of at least two paths in parallel on a same screen, a cursor in a program of a path other than the path of the editing target program is moved so as to be aligned on a same row, in conjunction with the cursor; judgment means for judging whether a block in which a cursor exists has information indicating a synchronization target; means for making the cursor movement control means invalid to stop the movement of the cursor when the judgment means detects a block having information indicating a synchronization target in any of the path; means for searching a block having information corresponding to the information indicating a synchronization target of a block of the program where the cursor stopped, concerning a program of a path where a block having the information indicating a synchronization target does not exist at a cursor position, after movement of the cursor stops; means for shifting a program so that the block acquired by the searching comes to the cursor position; and means for making the cursor movement control means valid to enable movement of a cursor, after the shift of the program is completed and a synchronization target block of a program of each path is positioned at a cursor position. Hence the synchronization target blocks can be displayed on a same row.

A fifth aspect of the numerical controller according to the present invention comprises: storage means for initially setting a predetermined operation elapsed time for checking the synchronization relationship; cursor movement control means by which when a cursor that points to an editing location in an editing target program is relatively moved with respect to the program by an operation of cursor operation means in a state of displaying programs of at least two paths in parallel on a same screen, a cursor in a program of a path other than the path of the editing target program is relatively moved with respect to the program, so as to be aligned on a same row, in conjunction with the cursor; means for calculating operation time required for executing instructions of a block of a program in each path indicated by a cursor, for each path; integration means for integrating the operation time determined for each path; judgment means for judging whether the block is a block when the operation time integrated by the integration means matches or exceeds the predetermined operation elapsed time stored in the storage means; means for stopping relative movement of the cursor with respect to a program in a path for which the judgment means has judged that the integrated operation time matches or exceeds the predetermined operation elapsed time stored in the storage means; means for adding the predetermined operation elapsed time to a time stored in the storage means when the relative movement of the programs of all the displayed path with respect to a cursor stop; and means for having the cursor movement control means relatively move the cursor with respect to a program using the operation of the cursor operation means again, after relative movement of the programs of all the displayed path with respect to a cursor stops. Hence blocks to be executed in a program of each path based on the operation elapsed time can be displayed on a same row, at each predetermined operation elapsed time, using a cursor operation.

A sixth aspect of the numerical controller according to the present invention comprises: storage means for initially setting a predetermined operation elapsed time for checking a synchronization relationship; cursor movement control means by which when a cursor that points to an editing location in an editing target program is moved by an operation of cursor operation means in a state of displaying programs of at least two path in parallel on a same screen, a cursor in a program of a path other than the path of the editing target program is moved so as to be aligned on a same row, in conjunction with the cursor; means for calculating operation time required for executing instructions of a block of a program in each path indicated by a cursor, for each path; integration means for integrating the operation time calculated for each path from the beginning of the program of the path; judgment means for judging whether a path in which integrated operation time integrated by the integration means matches or exceeds time stored in the storage means exists among the plurality of paths; means for making the cursor movement control means invalid to stop the movement of the cursor, when the judgment means judges that the integrated operation time of one path matches or exceeds the predetermined operation elapsed time stored in the storage means; means for scrolling a program of a path of which integrated operation time does not reach the time stored in the storage means by the operation of the cursor operation means after the movement of the cursor is stopped; means for stopping the scrolling when the judgment means judges that a block, of which integrated operation time reaches the time stored in the storage means, has reached the cursor position; means for adding the predetermined operation elapsed time to a time stored in the storage means after scrolling of all the programs in scrolling state stops; and means for making the cursor movement control means valid to enable movement of the cursor after scrolling of all the programs in scrolling state stops. Hence blocks to be executed in a program of each path based on the operation elapsed time can be displayed on a same row, at each predetermined operation elapsed time by a cursor operation.

A seventh aspect of the numerical controller according to the present invention comprises: storage means for initially setting a predetermined operation elapsed time for checking a synchronization relationship; cursor movement control means by which when a cursor that points to an editing location in an editing target program is moved by an operation of cursor operation means in a state of displaying programs of at least two paths in parallel on a same screen, a cursor in a program of a path other than the path of the editing target program is moved so as to be aligned on a same row, in conjunction with the cursor; means for calculating operation time required for executing instructions of a block of a program, for each path; integration means for integrating the operation time calculated for each path from the beginning of the program of the path; judgment means for judging whether a path in which integrated operation time integrated by the integration means matches or exceeds the time stored in the storage means exists among the plurality of paths; means for making the cursor movement control means invalid to stop the movement of the cursor, when the judgment means judges that the integrated operation time of any path matches or exceeds the time stored in the storage means; means for searching a block of which integrated operation time determined by the integration means reaches the time stored in the storage means, concerning programs of a path of which the integrated time matches or does not exceed the time stored in the storage means after movement of the cursor stops; means for shifting a program so that the block searched by the means of searching comes to the cursor position; means for adding the predetermined operation elapsed time to the time stored in the storage means when a shift of the program completes; and means for making the cursor movement control means valid to enable movement of a cursor after a shift of the program completes. Hence blocks executed in a program of each path based on the operation elapsed time can be displayed on a same row, at each predetermined operation elapsed time by a cursor operation.

Since the numerical controller according to the present invention has the above configuration, instructions which operate simultaneously between the paths, and confirmation of execution sequence and queue positions can be accurately and quickly performed, and therefore multi-path programs can be edited efficiently, and operation time can be decreased.

BRIEF DESCRIPTION OF THE DRAWINGS

The above mentioned object and characteristics and other objects and characteristics will be clarified by the following description of the embodiments with reference to the accompanying drawings. Out of these drawings:

FIGS. 3A to 3C are diagrams illustrating a first example of a display screen of a display device in the alignment processing shown in the flow chart in FIG. 2;

FIGS. 4A to 4C are diagrams illustrating a second example of a display screen of a display device in the alignment processing shown in FIG. 2;

FIGS. 6A to 6C are diagrams illustrating a first example of a display screen of a display device in the alignment processing shown in the flow chart in FIG. 5;

FIGS. 7A to 7C are diagrams illustrating a second example of a display screen of a display device in the alignment processing shown in the flow chart in FIG. 5;

DETAILED DESCRIPTION OF THE PREFERRED EMBODIMENTS

Figure 1:
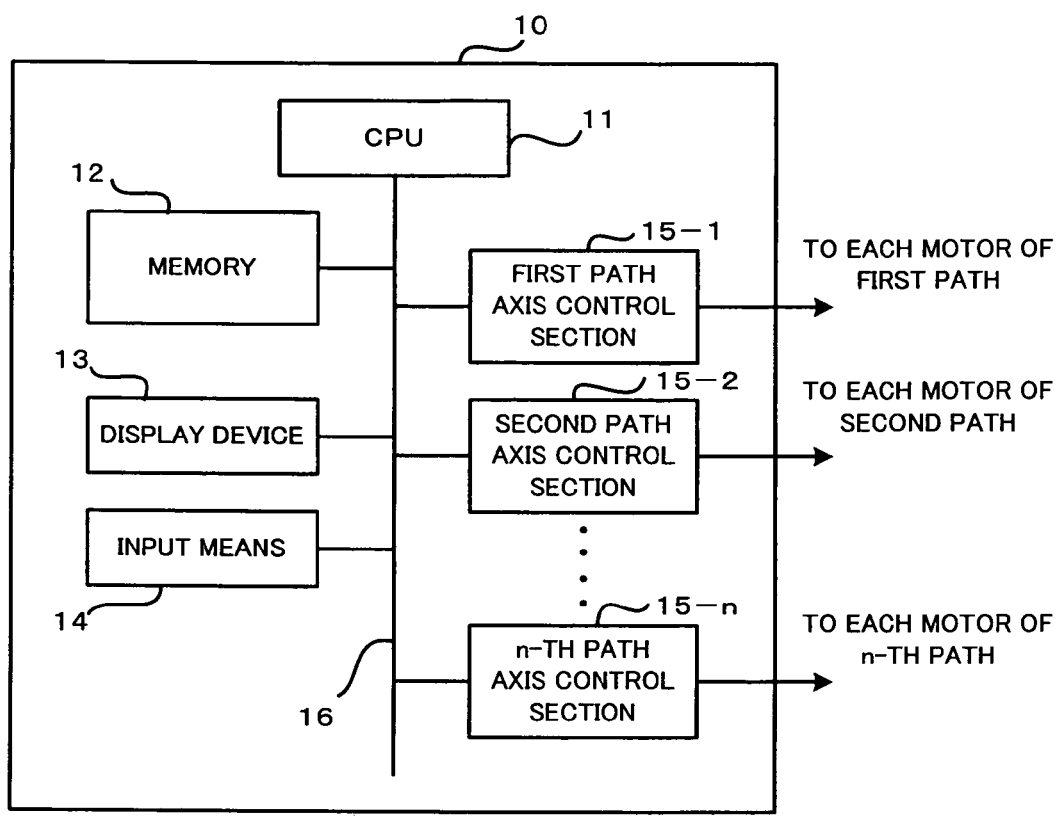
FIG. 1 is a diagram illustrating an overview of a numerical controller according to an embodiment of the present invention.

FIG. 1 is a diagram illustrating an overview of the numerical controller according to an embodiment of the present invention. The hardware configuration of this numerical controller is the same as the configuration of the conventional numerical controller having a multi-path control function. This numerical controller has a memory storing software to execute a function to display block positions of synchronizing programs, so as to be easily recognized when the programs of each path are displayed and edited, which is a different aspect from the conventional numerical control.

A numerical controller 10 comprises a processor 11, memory 12 such as ROM, RAM and non-volatile RAM, a display device 13 comprised of a CRT or liquid crystal display, input means 14, such as a keyboard for inputting data and commands, and a first to n-th axis control sections 15-1 to 15-n for controlling a motor for driving a movable axis of each path, which are connected to the processor 11 via a bus 16.

In the memory 12, programs of each path are stored, and software of program editing processing is also stored, and in particular, software for executing processing for synchronous alignment mode (described later), related to the present invention, is stored.

The path axis control sections 15-1 to 15-n perform feedback control of position and velocity, based on a movement instruction, which are distributed by the processor 11 after executing the program of each system, and a feedback signal from a position/velocity detector installed in a motor, and also perform current feedback to control the motor of each path, and move each axis of each path synchronously or independently.

This multi-path driving control operation by the numerical controller 10 is not different from a driving control operation by the conventional numerical controller having a multi-path control function.

The difference of the numerical controller according to the present invention from the conventional numerical controller is that a synchronous alignment mode is provided so that synchronous alignment can be performed when each program of the multi-path is edited.

First an algorithm of the synchronous alignment processing according to a first aspect of the synchronous alignment mode executed by the numerical controller 10 of the present embodiment will be described with reference to the flow chart in FIG. 2. FIGS. 3A to 3C and FIG. 4A to 4C are diagrams illustrating a display screen of a display device 13 in the alignment processing in the synchronous alignment mode of the first aspect. In FIGS. 3A to 3C and FIGS. 4A to 4C, the frame indicated by a reference number 20 shows a display range on the display screen. The reference number 21 indicates a cursor.

In the first aspect, a sequence number is used as information to indicate a synchronization target block for which synchronous alignment is performed, and sequence numbers to be synchronized are set by parameters in advance. In the example shown in FIGS. 3A to 3C and FIGS. 4A to 4C, "N333" and "N444" are set as sequence numbers of the blocks for which synchronous alignment is performed, as a sequence number of the block. In the parallel display of each program, blocks having this predetermined synchronization target sequence number are displayed so as to be aligned on a same row, therefore the operator can recognize the synchronization relationship easily.

To edit programs, the operator selects a plurality of paths to be displayed simultaneously, and inputs a simultaneous display operation instruction for programs of those path via the input means 14. Then the programs of selected paths are simultaneously displayed on the display screen of the display device 13 in parallel. In the example in FIGS. 3A to 3c, the first to third paths are selected, and the programs of the first to third paths are displayed in parallel in the horizontal direction. In the example in FIGS. 4A to 4C, the first to fourth paths are selected, and the programs of the first to fourth paths are displayed in parallel in the horizontal direction and vertical direction.

Figure 2:
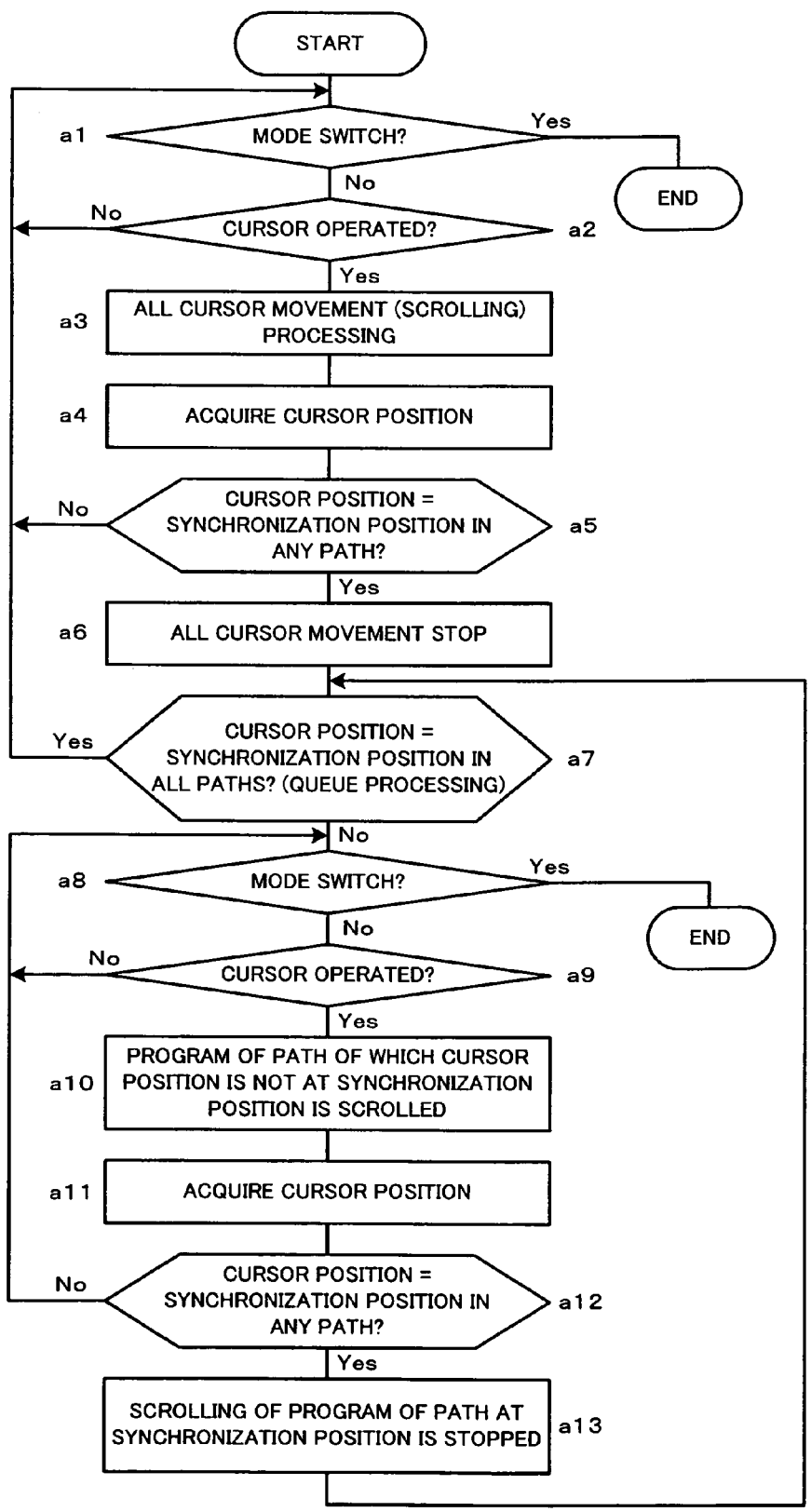
FIG. 2 is a flow chart illustrating an algorithm of alignment processing according to a first aspect of synchronous alignment mode executed by the numerical controller in FIG. 1.

If mode is switched to synchronous alignment mode by a mode switching operation when programs of the selected paths are displayed in parallel, and are being edited, the processor 11 starts processing as shown in FIG. 2. The synchronous alignment processing shown in FIG. 2 can be applied to either the layout of a program of the screen of the display device 13 as shown in FIGS. 3A to 3c, or as shown in FIGS. 4A to 4c.

First it is repeatedly judged whether the switching operation from synchronous alignment mode to another mode was executed (step al), and whether the cursor was operated by the cursor operation means disposed in the input means 14 (operation to move the cursor downward) (step a2). If a cursor to indicate an editing location is operated, the cursors 21 of all the displayed paths are relatively moved with respect to the program (step a3). In this case, in conjunction with the cursor of an editing target program, the cursors 21 of the other path are moved so as to be aligned on a same row.

If a cursor is operated in a state where the cursors 21 exists at the position shown in FIG. 3A, the cursors of the other paths are also moved as shown in FIG. 3B, in conjunction with the cursor 21 which indicates the editing location of the editing target program. When the cursor 21 reached the very bottom of the display range, the program scrolls up, by which the cursor 21 relatively moves with respect to the program. If the input means 14 operates a next page key, the cursor 21 moves to the next row, and the program display is changed to a display where the row on which the cursor 21 positions is the first row of the display range. If the mode switching operation is performed, this synchronous alignment processing ends.

Then the position of each cursor 21 on the program of each path is read (step a4), and it is judged whether the sequence number of the block where the cursor 21 is positioned on the program of each path matches the predetermined synchronization target sequence number. If the cursor 21 is not at a position of a block having the synchronization target sequence number in any program of any path, processing returns to step al, and processing in step al to a5 is repeatedly executed. If the cursor 21 comes to a position of a block having a synchronization target sequence number in any of the paths, movement of the cursors 21 of all the paths stops (step a6). In FIG. 3B, the cursor 21 is at the position of "N333", that is, the predetermined synchronization target sequence number, in the program of the first path, so all the cursors stop movement at this position (row).

Then the processor 11 judges whether the cursor is positioned on a block having the synchronization target sequence number in the programs of all the displayed paths (step a7). If the cursor 21 is not positioned on a block having the synchronization target sequence number for all the programs, then it is judged whether the mode switching operation was performed (step a8), and whether the cursor was operated (step a9). When the cursor is operated (operation to move the cursor downward), only a program where the cursor is not positioned on a block having the synchronization target sequence number is scrolled, and the program display moves upward one row at a time (step a10). Then the position of the cursor 21 on the scrolled program is read (step a11), and it is judged whether the position is the position of a block having the synchronization target sequence number (step a12). If it is not a position of a block having the synchronization target sequence number, processing returns to step a8, and processing in steps a8 to a12 is repeatedly executed.

If it is judged that the position of the cursor 21 on the scrolled program is a position of a block having the synchronization target sequence number, scrolling of the program in which the cursor is at the synchronization position is stopped (step s13), and processing returns to step a7. Hereafter processing after step a7 is executed, and if it is judged that the cursor position reached on a block having the synchronization target sequence number in all the displayed programs in step a7, processing returns to step a1. In this way, the cursor is positioned on a block having the synchronization target sequence number in each program, and these blocks having the synchronization target sequence number are displayed aligned on a same row, hence the synchronization relationship in each program becomes clear to the operator.

FIG. 3C and FIG. 4C show examples of blocks having the synchronization target sequence number "N333" being displayed aligned at the cursor positions on a same row line.

If the cursor is operated next (step a2), all the cursors 21 move (step a3), as mentioned above, and the above mentioned processing after step a4 is executed again. In the example in FIGS. 3A to 3C, blocks having the next synchronization target sequence number "N444" are aligned so as to be on a same row line. In the case of this example, first the cursor 21 is positioned at the block having the sequence number "N444" in the program of the second path, so the cursor movement stops at this position. On the other hand, programs in the first and third paths are scrolled, and the scrolling of the program in the third path stops when the block having the sequence number "N444" of the program in the third path is scrolled up to the stopping cursor position. Then the scrolling of the program of the first path stops when the block having sequence number "N444" of the program of the first path reaches the cursor position. In this way, the blocks having the sequence number "N444" in each program are indicated by the cursors, and are displayed on a same row. This operation is executed until the mode switching operation is executed, or the program ends.

Now an algorithm of the synchronous alignment processing according to a second aspect of the synchronous alignment mode executed by the numerical controller 10 of the present embodiment will be described with reference to the flow chart in FIG. 5. FIGS. 6A to 6C and FIGS. 7A to 7C are diagrams illustrating a display screen of a display device 13 in the alignment processing in the synchronous alignment mode of the second aspect. In FIGS. 6A to 6C and FIGS. 7A to 7C, the frame indicated by a reference number 20 shows a display range on the display screen. The reference number 21 indicates a cursor.

In the second aspect, just like the above mentioned first aspect, a sequence number is used as information to indicate a synchronization target block for which synchronous alignment is performed, and is preset by a parameter in advance. In the example shown in FIGS. 6A to 6C and FIGS. 7A to 7C, "N333" and "N444" are set as sequence numbers of the blocks for which synchronous alignment is performed. In the parallel display of each program, blocks having this predetermined synchronization target sequence number are displayed so as to be aligned on a same row, therefore the operator can recognize the synchronous relationship easily. In the case of the second aspect, movement of all the cursors is stopped when a cursor is positioned in a block having a synchronization target sequence number in an editing target program. Then for the other displayed programs, a block having a same sequence number as the synchronization target sequence number where the cursor is positioned is searched, and the detected block is moved up to the position of the cursor which is stopped. By this, all blocks having the synchronous target sequence number are displayed so as to be aligned on a same row. This point is different from the first aspect.

Figure 5:
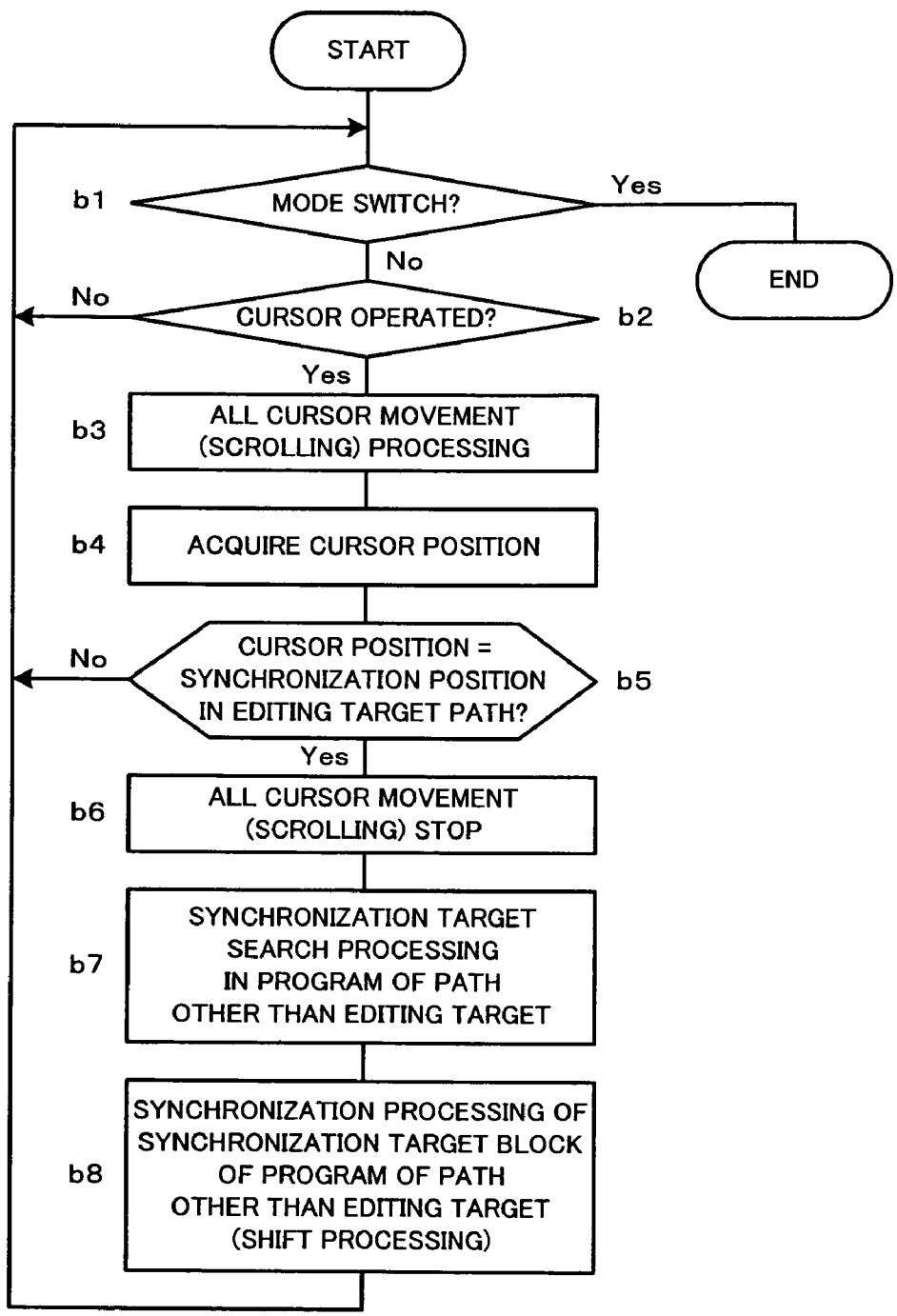
FIG. 5 is a flow chart illustrating an algorithm of alignment processing according to a second aspect of synchronous alignment mode executed by the numerical controller in FIG. 1.

To edit programs, the programs of selected paths are displayed simultaneously in parallel on the display screen of the display device 13, and if a mode is switched to synchronous alignment mode by the mode switching operation, the processor 11 starts the processing shown in FIG. 5. In the second aspect, the first to third paths are selected in the example in FIGS. 6A to 6C, and the first to fourth paths are selected in the example in FIGS. 7A to 7C, and the programs of each path are displayed in parallel and edited. In FIG. 5, the processing of steps b1 to b4 are the same as the processing of steps a1 to a4 in FIG. 2 of the first aspect. The synchronous alignment processing in FIG. 5 can be applied to either the layout of programs on the screen of the display device 13, as shown in FIGS. 6A to 6C, or as shown in FIGS. 7A to 7C.

The cursor of the editing target program is moved by operating the cursor. In conjunction with the cursor, the cursors on the other displayed programs are also moved so as to be aligned on the same row. The processor 11 judges whether the sequence number in the block at the cursor position in the editing target program matches the predetermined synchronization target sequence number (step b5). If there is no match, processing returns to step b1, and the processing in steps b1 to b5 is repeatedly executed. If the cursor position in the editing target program matches the position of the block having the synchronization target sequence number, the movement (scrolling) of all the cursors are stopped (step b6). In FIGS. 6A to 6C, if all the cursors move from the state shown in FIG. 6A, and if the synchronization target sequence number "N333" is detected first in the program of the first path, which is the editing target, as shown in FIG. 6B, the movement of all the cursors stop at this position.

Then the programs of the paths other than the editing target path are searched, and a block having the sequence number corresponding to the sequence number at the cursor position ("N333") is detected in the editing target program (step b7). If a block having the corresponding sequence number is searched, the program is moved (shifted) so that this block comes to the stopping position of the cursor. Then the blocks having the corresponding synchronization target sequence number of the programs of each path are displayed in a state indicated by the cursor 21 (step b8), and processing returns to step b1. FIG. 6C and FIGS. 7A to 7CC show examples of the blocks of each program having the corresponding synchronization target sequence number "N333" being indicated by the cursors 21, aligned and displayed on the same row. Even if a cursor passes the block in a program of another path having the corresponding sequence number when the cursor is stopped at a position of a block having a synchronization target sequence number in the editing target program, the sequence number is searched for the entire program, so the block having the corresponding sequence number is shifted to the cursor position, and is disposed on the same row.

If the cursor is operated here, the processing in steps b1 to b8 is executed, and the cursor stops at a position of the block having the synchronization target sequence number which appears next in the editing target program, and blocks of other programs, corresponding to this sequence number, are positioned at each cursor position and displayed on the same row. This operation is hereafter executed until mode is switched or until the program ends. In this way, the synchronization target blocks are all displayed on a same row, and the synchronization relationship in each program becomes clear to the operator.

According to this second aspect, the movement of the cursor 21 is stopped when the cursor on the editing target program reaches the synchronization target sequence number, then the programs of the other paths are searched and blocks having the corresponding sequence number are searched, and the programs are shifted so that the searched blocks come to the cursor position. Instead of this, when the cursor 21 is moved, the movement of the cursor may be stopped when the cursor 21 reaches a synchronization target sequence number in a program of any of the paths, so that the synchronization target sequence number is searched for the programs of the other paths, and blocks having the sequence number is shifted to the cursor position, just like the first aspect.

In the above mentioned first and second aspects, a sequence number is used as the information to indicate a synchronization target block, but in a predetermined instruction code (e.g. G code, M, S, T and B codes) may be used instead of a sequence number. The predetermined code is attached to a synchronization target block in a program in advance, and this information is set in the memory 12 as a predetermined code to indicate a synchronization target block.

The synchronous alignment processing based on the predetermined instruction code is the same as the above mentioned flow charts in FIG. 2 and FIG. 5 according to the first and second aspects, where only the predetermined code, instead of the sequence number, is used for judging the synchronization position, so description on the synchronous alignment processing based on the predetermined instruction code is omitted.

Instead of a sequence number, the synchronization target block may be specified by a predetermined mark. Examples of this predetermined mark are a specific character and symbol (e.g. "*"), a reverse display of a block, or a changed background color. The synchronous alignment processing when this mark is used is the same as the flow chart shown in FIG. 2 and FIG. 5 according to the above first and second aspects, where only the synchronization position is judged by the predetermined mark instead of the sequence number, so description on the synchronous alignment processing based on the predetermined mark is omitted. If the predetermined mark is used instead of the sequence number in the first aspect, the synchronized block is detected by reading the program from the beginning, and the corresponding blocks of the synchronization target exist in the time sequence, so it is sufficient if the mark is simply attached.

In the case of the second aspect, however, corresponding blocks of the synchronization target are searched and extracted from the entire program, so the marks must be distinguished for each synchronization target block so that the corresponding blocks of the synchronization target can be identified. For example, such a mark as "*1", "*2" . . . "*n" that can distinguish each corresponding synchronization target block must be assigned.

In the second aspect as well, when a cursor of one of the paths reaches a position of a block having a mark, if the movement of the cursor is stopped and each block of the program after this cursor position is searched for the program of the other paths where a mark is not yet detected, and a block having a mark which is detected first is shifted to the cursor position, then it is sufficient to simply assign a mark to the blocks, just like the first aspect.

In each of the above mentioned aspects, synchronization target blocks are displayed on a same row in the programs of each path, so that the operator can easily know the synchronization relationship, but in the following third and fourth aspects, the synchronization relationships are recognized corresponding to the operation elapsed time. In other words, in these aspects, the operation execution position of the programs of each path are displayed on a same row corresponding to the operation elapsed time.

Now an algorithm of the synchronous alignment processing according to a third aspect of the synchronous alignment mode executed by the numerical controller 10 of the present embodiment will be described with reference to the flow chart in FIG. 8. FIGS. 9A and 9B and FIGS. 10A and 10B are diagrams illustrating display screens of a display device 13 in the alignment processing in the synchronous alignment mode of the third aspect. In FIGS. 9A and 9B and FIGS. 10A and 10B, the frame indicated by a reference number 20 shows a display range on the display screen. The referenced number 21 indicates a cursor.

In the third aspect, positions of the programs operating in each path are displayed on a same row by a cursor position for each predetermined synchronization target operation elapsed time Ts, so that the synchronization relationship can be recognized. If the instruction for the block of the program is a movement instruction, the execution time (operation time) with this instruction is determined by dividing the instructed moving distance by an instructed velocity. If the operation time cannot be calculated based on the instruction for the block, since the block instruction of the program is not a movement instruction (e.g. auxiliary function instruction), then operation time which is set by a parameter in advance is referred to.

Figure 8:
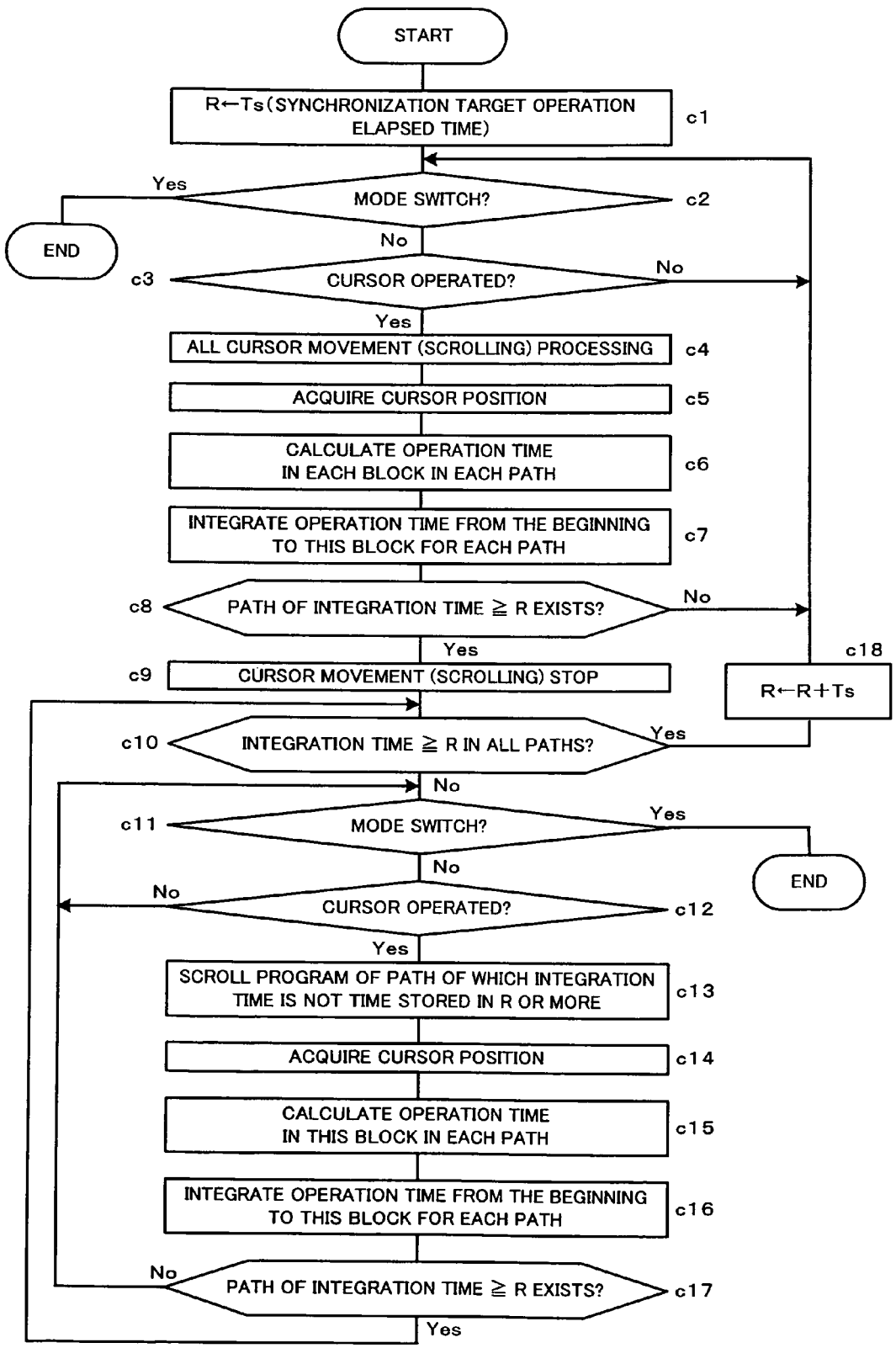
FIG. 8 is a flow chart illustrating an algorithm of alignment processing according to a third aspect of synchronous alignment mode executed by the numerical controller in FIG. 1.

Programs of the selected paths are displayed in parallel on a display screen of the display device 13, and when a program is edited, a synchronization target operation elapsed time Ts is set via the input means 14 (or this synchronization target operation elapsed time Ts is set by a parameter in advance), mode is switched to synchronous alignment mode, then the processor 11 starts processing shown in FIG. 8.

First the synchronization target operation elapsed time Ts, which is set by a parameter in advance, is set to a register R (step c1), then it is repeatedly judged whether the switching operation from this synchronous alignment mode to another mode was performed (step c2), and whether the cursor was operated by the input means 14 (operation to move the cursor downward) (step c3). If a cursor to indicate an editing location is operated by the cursor operation means, the cursors 21 of all the displayed paths are moved (step c4). In this case, in conjunction with the cursor 21 of an editing target program, the cursors 21 of the other paths are moved so as to be alignment on a same row. Then the position of the cursor 21 on the program of each path is read (step c5), and the operation time for executing the instruction for the block at this cursor position is calculated for each program of each path (step c6). If the instruction is a movement instruction, as mentioned above, the instructed moving distance is divided by the instructed velocity to determine the operation time. For example, if the instruction for a block is G91 G01 X100. F100, this means that the X coordinate value moves 100 mm at 100 mm/min velocity, so moving distance (100)/velocity (100)=1, that is, the operation time required for executing the instruction for this block is 1 minute. For such a block instruction as an auxiliary function instruction, whereby operation time cannot be determined, the operation time required for executing the instruction is stored in the memory, so the operation time corresponding to the block instruction is read from the memory.

The operation time for executing an instruction in each block, determined like this, is integrated for each program to determine the operation time from the beginning of the program (step c7). Then this integrated operation time is compared with the time stored in the register R, and it is judged whether a program (path) where the integration time reached or exceeded a time stored in the register R exists (step c8). If the integrated time does not reach the time stored in the register R for the programs of all the paths, processing returns to step c2, and processing in step c2 to c8 is repeatedly executed until the integrated time reaches or exceeds the time stored in the register R in a program of any of the paths.

If the integrated time reaches or exceeds the time stored in the register R in a program of any of the paths, movement (scrolling) of the cursor stops (step c9), and it is judged whether the integrated time reached or exceeded the time stored in the register R in the program of all the paths (step c10). If the integrated operation time of the programs of all the paths have not reached the time stored in the register R, it is repeatedly judged whether the mode switching operation was executed (step c11), and whether the cursor was operated (step c12). If the cursor was operated here, the program of the path where the integrated time is not a time stored in the register R or more is scrolled (step c13), then the instruction for the block at the cursor position is read (step c14), then the operation time required for executing this instruction for the block is determined by the above mentioned method (step c15), and this determined time is integrated for each path (step c16).

Then it is judged whether there is a program of which integrated time has already reached the time stored in the register R among the programs in which the cursor was scrolled (step c17). If any program has not yet reached the time stored in the register R, processing returns to step c11. Then the processing from step c11 to step c17 is repeatedly executed until the integrated time reaches or exceeds the time stored in the register R in any program in which the cursor was scrolled. If there is a program (path) of which integrated time reached or exceeded the time stored in the register R among the programs in which the cursor was scrolled, processing returns from step c17 to step c10, and it is judged whether the integrated time has reached or exceeded the time stored in the register R in all the paths. If the integrated time has not reached or exceeded the time stored in the register R in all the paths, the above mentioned processing after step c11 is executed. When the integrated time reaches or exceeds the time stored in the register R in all the paths, the synchronization target operation elapsed time Ts, which is set by the parameter in advance, is added to the register R (step c18), and processing returns to step c2.

In the register R, time (Ts+Ts=)2Ts is set, so the processing in step c2 to step c17 is executed, and the block of the program, when the operation time from the beginning of the program is 2Ts or more, is displayed at a cursor position on a same row.

Hereafter, a multiple of the predetermined synchronous target operation elapsed time Ts is set in the register R, such as 3Ts, 4Ts, . . . , so if the cursor is operated, blocks of the programs executed at this point are displayed on a same row at every predetermined synchronization target operation elapsed time Ts, and correspondence of operation execution states of programs of each path can be recognized.

Figure 9A:
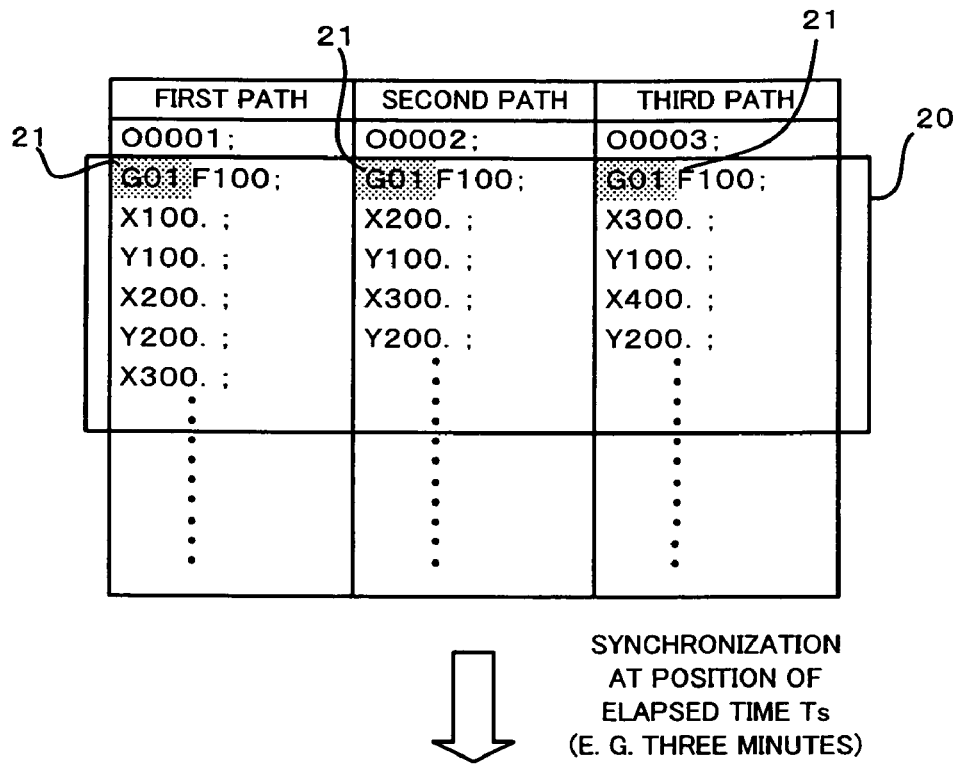
FIGS. 9A and 9B are diagrams illustrating a first example of a display screen of a display device in an alignment processing shown in the flow chart in FIG. 8.
Figure 9B:
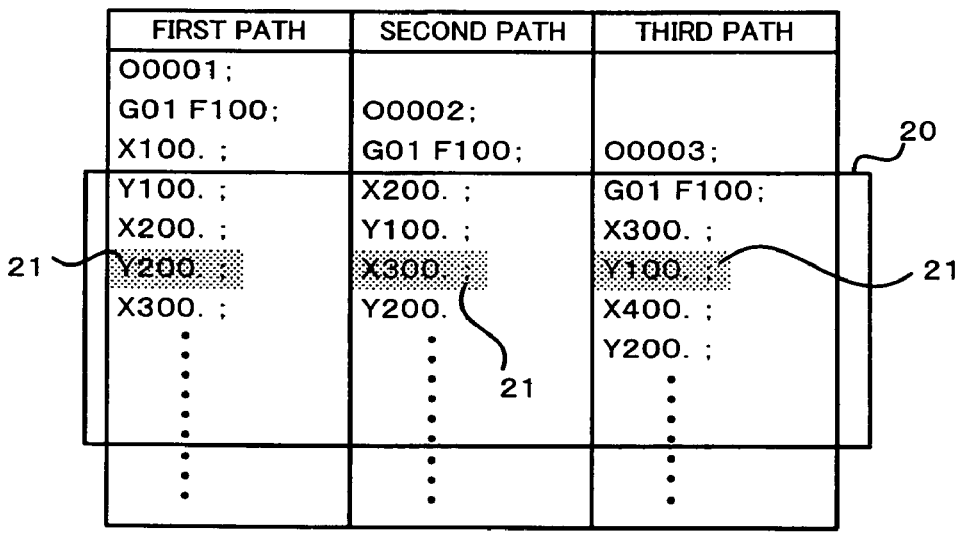
Figure 10A:
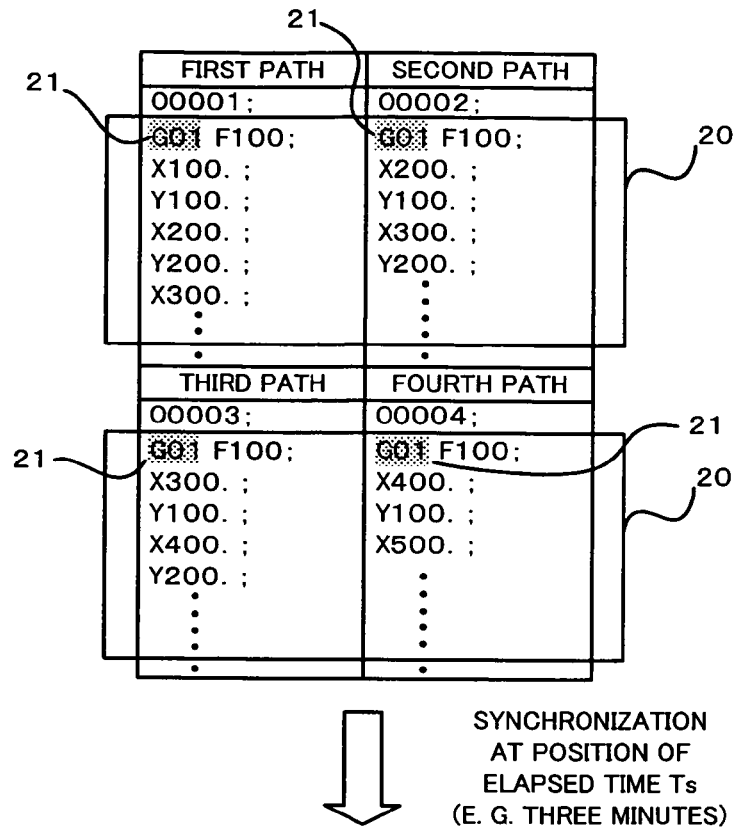
FIGS. 10A and 10B are diagrams illustrating a second example of a display screen of a display device in an alignment processing shown in the flow chart in FIG. 8.
Figure 10B:
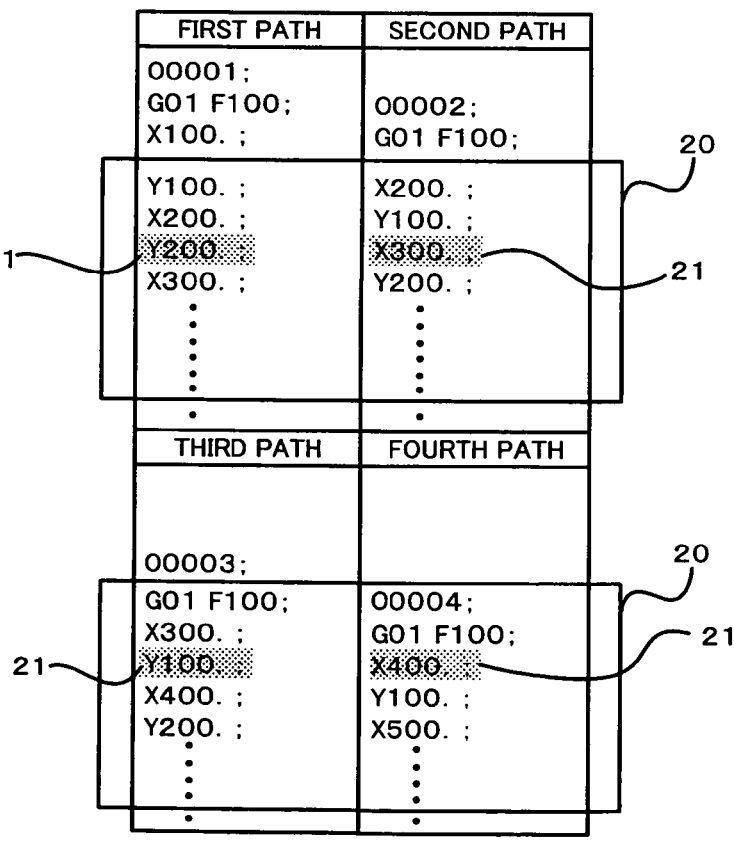

FIGS. 9A and 9B and FIGS. 10A and 10B are diagrams illustrating display screens according to the third aspect. The synchronous alignment processing shown in FIG. 8 can be applied to both the layout of the programs as shown in FIGS. 9A and 9B on the screen of the display device 13, or as shown in FIGS. 10A and 10B. FIG. 9A and FIG. 10A show display examples before starting the synchronous alignment processing to align the operation elapsed time. FIG. 9B and FIG. 10B show examples of displaying the execution blocks of each path using the cursor position aligned on a same row when the synchronous alignment processing is executed, and the predetermined synchronization target operation elapsed time Ts has elapsed.

Figure 11:
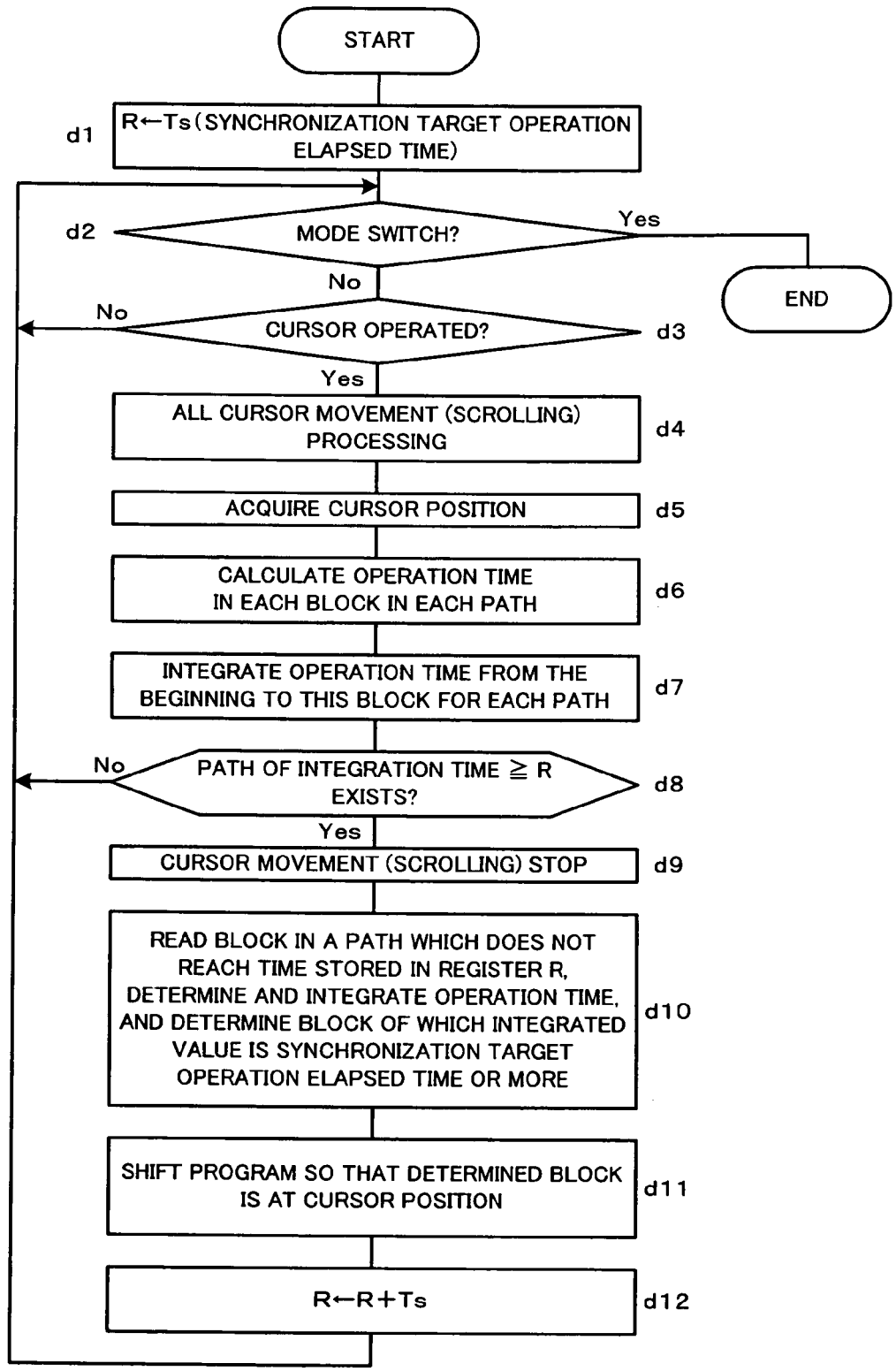
FIG. 11 is a flow chart illustrating an algorithm of alignment processing according to a fourth aspect of synchronous alignment mode executed by the numerical controller in FIG. 1.

Now an algorithm of the synchronous alignment processing according to a fourth aspect of the synchronous alignment mode executed by the numerical controller 10 of the present embodiment will be described with reference to the flow chart in FIG. 11. In the fourth aspect, the synchronization relationship can be recognized by displaying the program positions of operation in each path on a same row line using a cursor position, at each predetermined synchronization target operation elapsed time Ts, just like the above mentioned third aspect.

The processing in step d1 to step d9 is the same as the processing in step c1 to step c9 of the flow chart in FIG. 8 according to the third aspect. In other words, the cursors on the programs of each path, displayed in parallel, are moved so as to be aligned on a same row, and integrated time (operation time) until a block of the program in each path where the cursor is positioned is determined for each path. Then it is judged whether the integrated time of any one path has reached or exceeded the synchronization target operation elapsed time Ts which is set in the register. When a program has reached the synchronization target operation elapsed time Ts, movement (scrolling) of the cursor is stopped (step d9), and for a program of a path of which integrated time has not reached the time stored in the register, an instruction for a block is sequentially read, and time required for executing the instruction for the block is calculated and integrated. Then a block of which integrated time has already reached the time stored in the register is searched (step d10). If such a block is searched, the program is shifted so that the block comes to the cursor position (step d11). As a result, as FIG. 9B shows, for example, blocks of which time being set in the register match or blocks of which actual operation time of the block exceeds this time are displayed at the cursor positions on a same row, just like the case of operating each program in each path by executing the programs from the beginning of the program.

Then the synchronization target operation elapsed time Ts, which is set by a parameter in advance, is added to the register R (step d12), processing returns to step d2, and the above mentioned processing after step d2 is executed. In this way, blocks of the programs in each path, which are executed at this point, are displayed on a same row with the interval of the synchronization target operation elapsed time Ts, and can be recognized in association with the execution state (operation state) of the programs in each path.

What is claimed is:

1. A numerical controller having a multi-path control function and an editing function which allows programs of a plurality of paths to be displayed in parallel for editing the programs, comprising:
   a display device comprising cursor operation means for moving a cursor on a display screen;
   cursor movement control means by which when a cursor that points to an editing location in an editing target program is relatively moved with respect to said program by an operation of said cursor operation means in a state of displaying programs of at least two path in parallel on a same screen, a cursor in a program of a path other than the path of said editing target program is relatively moved with respect to the program so as to be aligned on a same row, in conjunction with said cursor;
   judgment means for judging whether a block in which a cursor exists has information indicating a synchronization target;
   means for relatively moving a program with respect to a cursor by the operation of said cursor operation means, and stopping the relative movement of the cursor with respect to the program by said cursor movement control means when said judgment means judges that the block has information indicating a synchronization target; and
   means for having said cursor movement control means execute relative movement of a cursor with respect to the program by the operation of said cursor operation means again after the relative movement of the programs of all the displayed paths with respect to the cursor stops, wherein
   the synchronization target blocks can be displayed on a same row by the cursor operation.

2. A numerical controller having a multi-path control function and an editing function which allows programs of a plurality of paths to be displayed in parallel for editing the programs, comprising:
   a display device comprising cursor operation means for moving a cursor on a display screen;
   cursor movement control means by which when a cursor that points to an editing location in an editing target program is moved by an operation of said cursor operation means in a state of displaying programs of at least two paths in parallel on a same screen, a cursor in a program of a path other than the path of said editing target program is moved so as to be aligned on a same row, in conjunction with said cursor;
   judgment means for judging whether a block in which a cursor exists has information indicating a synchronization target;
   means for making said cursor movement control means invalid to stop the movement of said cursor when said judgment means detects a block having information indicating a synchronization target in any of the paths;
   scrolling means for scrolling a program of a path which has no block having information indicating a synchronization target at a cursor position, by operation of said cursor operation means, after the movement of said cursor is stopped;
   scrolling stopping means for stopping the scrolling operation by said scrolling means when said judgment means has judged that a block having information indicating a synchronization target has reached a cursor position; and
   means for making said cursor movement control means valid to enable movement of a cursor after scrolling of all the programs in scrolling state stop, wherein
   the synchronization target blocks can be displayed on a same row by cursor operation.

3. The numerical controller according to claim 2, wherein the information indicating said synchronization target is a sequence number, predetermined instruction code or mark.

4. A numerical controller having a multi-path control function and an editing function which allows programs of a plurality of paths to be displayed in parallel for editing the programs, comprising:
   a display device comprising cursor operation means for moving a cursor on a display screen;

cursor movement control means by which when a cursor that points to an editing location in an editing target program is moved by an operation of said cursor operation means in a state of displaying programs of at least two paths in parallel on a same screen, a cursor in a program of a path other than the path of said editing target program is moved so as to be aligned on a same row, in conjunction with said cursor;

judgment means for judging whether a block in which a cursor exists has information indicating a synchronization target;

means for making said cursor movement control means invalid to stop moving of said cursor when said judgment means judges that a block in which a cursor exists in a editing target program has information indicating a synchronization target;

means for searching a block having information corresponding to the information indicating a synchronization target of the block in the program of the editing target path where the cursor stops, concerning programs of a path other than the path of the editing target program, after movement of said cursor stops;

means for shifting a program so that the block acquired by the searching comes to the cursor position; and means for making said cursor movement control means valid to enable movement of a cursor after a shift of the program completes, and a synchronization target block of a program of each path is positioned at the cursor position, wherein the synchronization target blocks can be displayed on a same row.

5. The numerical controller according to claim 4, wherein the information indicating said synchronization target is a sequence number, predetermined instruction code or mark.

6. A numerical controller having a multi-path control function and an editing function which allows programs of a plurality of paths to be displayed in parallel for editing the programs, comprising:

a display device comprising cursor operation means for moving a cursor on a display screen;

cursor movement control means by which when a cursor that points to an editing location in an editing target program is moved by an operation of said cursor operation means in a state of displaying programs of at least two paths in parallel on a same screen, a cursor in a program of a path other than the path of said editing target program is moved so as to be aligned on a same row, in conjunction with said cursor;

judgment means for judging whether a block in which a cursor exists has information indicating a synchronization target;

means for making said cursor movement control means invalid to stop the movement of said cursor, when said judgment means detects a block having information indicating a synchronization target in any of the paths;

means for searching a block having information corresponding to the information indicating a synchronization target of a block of the program where the cursor stopped, concerning a program of a path where a block having the information indicating a synchronization target does not exist at a cursor position, after movement of said cursor stops;

means for shifting a program so that the block acquired by the searching comes to the cursor position; and means for making said cursor movement control means valid to enable movement of a cursor after the shift of the program is completed, and a synchronization target block of a program of each path is positioned at a cursor position, wherein the synchronization target blocks can be displayed on a same row.

7. The numerical controller according to claim 6, wherein the information indicating said synchronization target is a sequence number, predetermined instruction code or mark.

8. The numerical controller according to claim 1, wherein the information indicating said synchronization target is a sequence number, predetermined instruction code or mark.

9. A numerical controller having a multi-path control function and an editing function which allows programs of a plurality of paths to be displayed in parallel for editing the programs, comprising:

a display device comprising cursor operation means for moving a cursor on a display screen;

storage means for initially setting a predetermined operation elapsed time for checking a synchronization relationship;

cursor movement control means by which when a cursor that points to an editing location in an editing target program is relatively moved with respect to the program by an operation of said cursor operation means in a state of displaying programs of at least two paths in parallel on a same screen, a cursor in a program of a path other than the path of said editing target program is relatively moved with respect to the program, so as to be aligned on a same row, in conjunction with said cursor;

means for calculating operation time required for executing instructions of a block of a program in each path indicated by a cursor, for each path;

integration means for integrating said operation time determined for each path from the beginning of the program;

judgment means for judging whether a path in which integrated operation time integrated by said integration means matches or exceeds the predetermined operation elapsed time stored in said storage means exists;

means for stopping the relative movement of said cursor with respect to a program of the path for which said judgment means has judged that the integrated operation time matches or exceeds the predetermined operation elapsed time stored in said storage means;

means for adding the predetermined operation elapsed time to a time stored in said storage means when the relative movement of the programs of all the displayed paths with respect to a cursor stop; and means for having said cursor movement control means relatively move the cursor with respect to a program by operation of said cursor operation means again, after relative movement of the programs of all the displayed paths with respect to a cursor stops, wherein blocks to be executed in a program of each path based on said operation elapsed time can be displayed on a same row for each predetermined operation elapsed time using cursor operation.

10. A numerical controller having a multi-path control function and an editing function which allows programs of a plurality of paths to be displayed in parallel for editing the programs, comprising:

a display device comprising cursor operation means for moving a cursor on a display screen;

storage means for initially setting a predetermined operation elapsed time for checking a synchronization relationship;

cursor movement control means by which when a cursor that points to an editing location in an editing target program is moved by an operation of said cursor operation means in a state of displaying programs of at least two paths in parallel on a same screen, a cursor in a program of a path other than the path of said editing target program is moved so as to be aligned on a same row, in conjunction with said cursor;

means for calculating operation time required for executing instructions of blocks of a program in each path indicated by a cursor, for each path;

integration means for integrating said operation time calculated for each path from the beginning of the program of said path;

judgment means for judging whether a path in which integrated operation time integrated by said integration means matches or exceeds the time stored in said storage means exists among said plurality of paths;

means for making said cursor movement control means invalid to stop the movement of said cursor, when said judgment means judges that the integrated operation time of any path matches or exceeds the predetermined operation elapsed time stored in said storage means;

means for scrolling a program of a path of which integrated operation time does not reach the time stored in said storage means by the operation of said cursor operation means after movement of said cursor stops;

means for stopping said scrolling when said judgment means judges that a block, of which the integrated operation time reaches the time stored in said storage means, has reached the cursor position;

means for adding the predetermined operation elapsed time to a time stored in said storage means after scrolling of all the programs in scrolling state stops; and means for making said cursor movement control means valid to enable movement of the cursor after scrolling of all the programs in scrolling state stops, wherein blocks to be executed in a program of each path based on said operation elapsed time can be displayed on a same row for each predetermined operation elapsed time by cursor operation.

11. A numerical controller having a multi-path control function and an editing function which allows programs of a plurality of paths to be displayed in parallel for editing the programs, comprising:

a display device comprising cursor operation means for moving a cursor on a display screen;

storage means for initially setting a predetermined operation elapsed time for checking a synchronization relationship;

cursor movement control means by which when a cursor that points to an editing location in an editing target program is moved by an operation of said cursor operation means in a state of displaying programs of at least two paths in parallel on a same screen, a cursor in a program of a path other than the path of said editing target program is moved so as to be aligned on a same row, in conjunction with said cursor;

means for calculating operating time required for executing instructions of a block of a program, for each path;

integration means for integrating said operation time calculated for each path from the beginning of the program of said path;

judgment means for judging whether a path in which integrated operation time integrated by said integration means matches or exceeds the time stored in said storage means exists among said plurality of paths;

means for making said cursor movement control means invalid to stop the movement of said cursor, when said judgment means judges that the integrated time of any path matches or exceeds the time stored in said storage means;

means for searching a block of which integrated operation time determined by said integration means reaches the time stored in said storage means, concerning programs of a path of which said integrated time matches or does not exceed the time stored in said storage means, after movement of the cursor stops;

means for shifting a program so that the block searched by said means for searching comes to the cursor position;

means for adding the predetermined operation elapsed time to the time stored in said storage means when shift of the program completes; and means for making said cursor movement control means valid to enable movement of a cursor after shift of the program completes, wherein blocks executed in a program of each path based on said operation elapsed time can be displayed on a same row for each predetermined operation elapsed time by cursor operation.

* * * * *